United States Patent [19]
Sabet

[11] Patent Number: 5,647,343
[45] Date of Patent: Jul. 15, 1997

[54] LATENT STORE

[76] Inventor: Huschang Sabet, Maybachstrasse 16, D-70469 Stuttgart, Germany

[21] Appl. No.: 428,173
[22] PCT Filed: Sep. 16, 1993
[86] PCT No.: PCT/EP93/02502
§ 371 Date: Apr. 19, 1995
§ 102(e) Date: Apr. 19, 1995
[87] PCT Pub. No.: WO94/09081
PCT Pub. Date: Apr. 28, 1994

[30] Foreign Application Priority Data

Oct. 19, 1992 [DE] Germany .................. 42 35 159.6

[51] Int. Cl.$^6$ ..................................................... F24J 2/34
[52] U.S. Cl. .................. 126/619; 126/617; 126/618; 126/620; 126/400; 126/714
[58] Field of Search ............................ 126/617, 400, 126/618, 619, 620, 714

[56] References Cited

U.S. PATENT DOCUMENTS 4,004,572  1/1977  Nathan .

FOREIGN PATENT DOCUMENTS 1248907  1/1989  Canada .

*Primary Examiner*—Larry Jones
*Attorney, Agent, or Firm*—Flynn, Thiel, Boutell & Tanis, P.C.

[57] ABSTRACT

The invention relates to a latent store with a photosensitive storage medium and a regenerating agent. To this end, an organic storage substance with at least two stable stereoisomeric configurations is used, the first of which is photosensitive and can be converted into the second configuration by photoisomerisation with the release of energy, while the second configuration can be reconverted into the first by contact with a solar radiation absorbing, stereoselective regenerating agent with energy absorption.

16 Claims, 2 Drawing Sheets

LATENT STORE

FIELD OF THE INVENTION

The invention is related to a latent store for storing the radiation energy of the sun.

BACKGROUND OF THE INVENTION

In latent heat stores it is per se known to store phase transformation energy, as for instance the heat of melting or the heat of vaporization, by heating at approximately constant temperature and to retrieve this energy from the store in the form of heat when needed. In order to achieve this, other forms of energy, such as electromagnetic energy, are first transformed into thermal energy and stored in this form.

SUMMARY OF THE INVENTION

It is the object of the invention to develop a latent store in the sense of a "solar radiation store", in which the incoming visible or ultraviolet sun rays can be stored directly latently without resorting to heat.

The solution according to the invention is based on the thought that visible or ultraviolet solar radiation may be used for the photoisomerization of organic molecules and therefore for storing energy and liberating this energy. In order to achieve this, it is suggested according to the invention to use an organic storage substance which has at least two stable stereoisomeric configurations, of which the first configuration is photosensitive and can be transformed into the second configuration by photoisomerization and liberation of energy, while the second configuration is transformable into the first configuration by contact with a stereoselective, preferably solar radiation-absorbing regeneration medium while absorbing energy.

According to a preferred embodiment of the invention the stereoisomers of the storage substance consist of a cis-retinal, preferably of 11-cis-retinal on the one hand and of all-trans-retinal on the other hand (retinal=vitamin $A_1$-aldehyde). As a regeneration medium a pigment stereoselective in the direction of regeneration, preferably melanin or a catalyst contained in the pigment is advantageously used. The photosensitive stereoisomeric configuration of the storage substance is advantageously screenable from radiation and subjectable to solar radiation for initiating the stereoisomeric transformation.

According to a preferred form of the invention the stereoisomeric storage substance on the one hand and the regeneration medium on the other hand are each positioned on a carrier, wherein the carriers are moveable with respect to each other, creating a contact between the storage substance and the regeneration medium, the photosensitive regeneration medium is constantly or intermittently subjected to solar radiation, and the storage substance is screened from the solar radiation during the contact phases and subjectable to solar radiation at least intermittently outside the contact phases.

Advantageously, the storage substance-carrier has a high thermal conductivity. In order to absorb the liberated energy, the storage substance-carrier as such or a heat conducting body which may be brought into thermal contact with the carrier during the contact phases is designed as a heat exchanger through which fluid and/or gas flows. The latter may be mechanically coupled to the regeneration medium carrier.

In a further advantageous embodiment of the invention, the regeneration medium carrier has at least one ring with a multitude of regeneration medium disks which are positioned at equal distances in a circumferential direction with respect to a central axis, and that in the region inbetween the regeneration medium disks windows are arranged which may be aligned to the sun and which are open toward the storage substance, wherein the storage substance carrier may be rotated with respect to the ring about the central axis in increments, and wherein contact may be established between the storage substance and the regeneration medium during the pauses. In this, the regeneration medium disks are preferably designed as plates stabilized by a lattice structure and preferably made of a powdered regeneration medium pressed using a binder. The plates are subjectable to sunlight on their outer side and may be pressed against the storage substance with their inner side.

The carrier accepting the storage substance may be designed as a cylinder, a cone or a prism, at whose outer or perimeter surface the storage substance is positioned, while the carrier of the regeneration medium may be designed as a hollow body surrounding the storage substance carrier. In order to initiate the contact phase and the irradiation phase, the regeneration medium carrier can be axially moved with respect to the storage substance carrier, preferably lifted and lowered in the way of a venetian blind.

In a further advantageous embodiment of the invention, the photosensitive configuration of the storage substance is bound to a stereospecific binding substrate for transport and storage purposes. The stereospecific binding substrate may consist of opsin which in conjunction with 11-cis-retinal forms rhodopsin as the photosensitive configuration of the storage substance. Alternatively, the stereospecific binding substrate may consist of a binding protein, which together with 11-cis-retinal forms the light insensitive compound CRALBP·11-cis-retinal (CRALBP=cellular retinal dehyde binding protein).

Further, the all-trans-retinal may enzymatically be transformed into all-trans-retinol and retransformed into the photosensitive 11-cis-configuration using a cellular retinol-binding protein (CRBP) for the regeneration by contact with the melanin pigment under cis-isomerization in the absence of light.

BRIEF DESCRIPTION OF THE INVENTION

In the following, an embodiment of the invention is further described with reference to the accompanying drawing, in which FIG. 1 shows a vertical cut through a section of an experimental apparatus, and FIG. 2 shows a top view of the regenerating medium carrier of the experimental apparatus according to FIG. 1.

DETAILED DESCRIPTION

Figure 1:
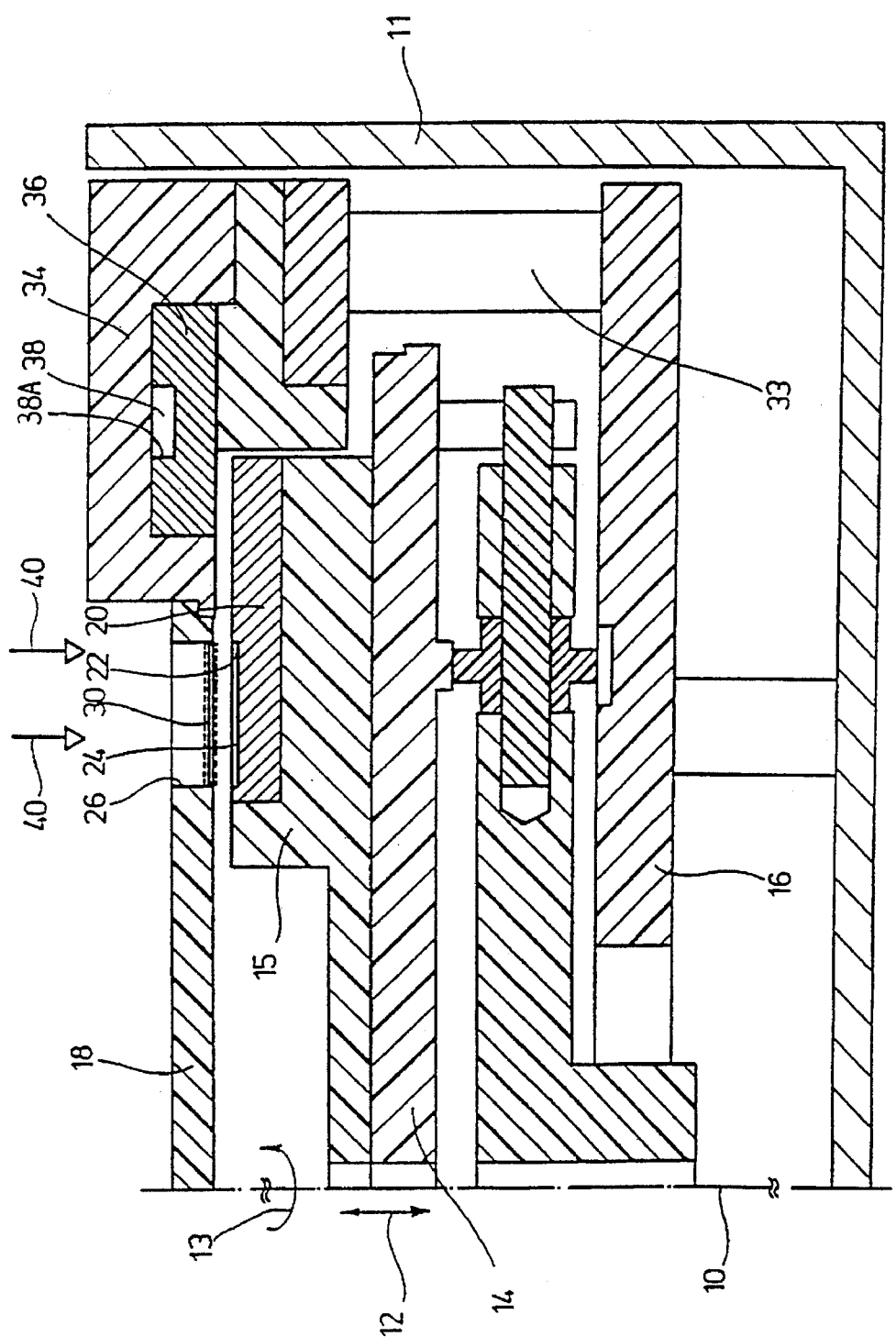
Figure 2:
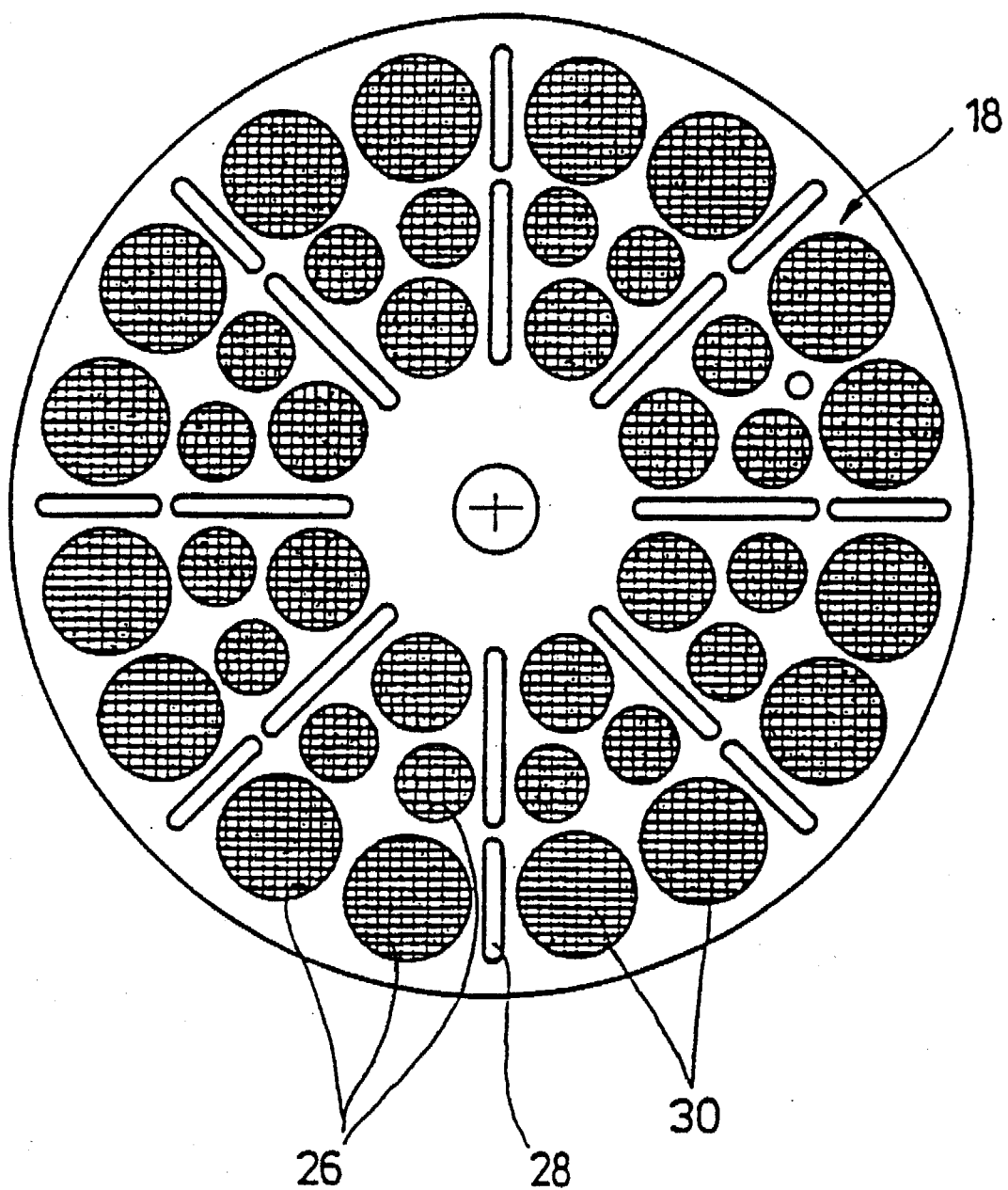

The experimental apparatus shown in the drawing serves to demonstrate heat transfer effects by a latent store subjected to solar radiation and is as yet not optimized with respect to its design. For the sake of clarity, the dimensions of the experimental apparatus are not drawn to scale in the drawing.

The experimental apparatus consists mainly of a first carrier structure 16 which is attached to the casing and a second carrier structure 14 which may be lifted and lowered parallel to the central axis 10 of the casing 11 in the direction of the double arrow 12. The second carrier structure 14 may additionally be rotated in steps in the direction of the arrow 13 about the central axis 10 with respect to the carrier disk 18 which is also attached to the casing. The second carrier structure 14 has in its upper region 15 a copper ring 20 having a ring shaped indentation 22 for accepting a stereoisomeric storage substance 24, preferably retinal in 11-cis and all-trans-configuration, while the circular carrier disk 18 is provided with circular openings 26 which are positioned in angular increments with respect to each other, as well as with long window recesses 28. Openings 26 are provided with pressed disks 30 which consist of regenerating medium in the form of powder, preferably a melanin pigment. Carrier disk 18 is positioned in a plastic ring 34 which is attached to the casing, and cannot be rotated. Plastic ring 34 is connected to carrier structure 16 by way of connecting bolts 33. A heat exchanger 36 designed as a copper ring, whose hollow 38A may be filled with a liquid and/or gaseous cooling medium 38, is located within plastic ring 34.

During operation the experimental apparatus is subjected to solar radiation in the direction of the arrows 40. The solar radiation thereby reaches the regenerating medium disks 30 as well as storage substance 24 by way of window recesses 28. Due to the radiation through windows 28, energy is liberated in the storage substance by photoisomerisation and transferred as heat to the copper ring 20.

By rotating carrier structure 14, the storage substance region previously used up by liberating energy is moved into the region of the adjacent regeneration medium disks 30 and is regenerated there by lifting carrier structure 14 and contacting the regeneration medium activated by solar radiation. The motion is advantageously controlled such that the regeneration process in the storage substance is mostly finished when solar radiation impinges through the following window 28.

During the lifting of carrier structure 14 in the direction of arrow 12 there is also a thermal contact between copper ring 20 and heat exchanger 36, by which the heat liberated from storage substance 24 is transferred to cooling medium 38. From the heating of cooling medium 38 conclusions may be drawn with respect to the occurring storage process.

In summary the following may be said: The invention is related to a latent store having a photosensitive storage medium and a regeneration medium. To this end, an organic storage substance having at least two stable stereoisomeric configurations is used, of which a first configuration is photosensitive and may be transformed into the second configuration by photoisomerization and liberation of energy, while the second configuration may be transformed back into the first configuration by contact with a stereoselective regeneration medium which absorbs solar radiation, during which energy is absorbed.

I claim:

1. A method for storing and liberating energy in a storage substance, comprising the steps of providing an organic storage substance having at least two stable stereoisomeric configurations, liberating energy from a first, photosensitive configuration of the storage substance by photoisomerization, and storing energy in the first configuration by contact with a solar radiation absorbing stereoselective regeneration medium.

2. The method of claim 1, wherein the step of liberating energy includes the step of transforming a cis-retinal as the first, photosensitive configuration of the storage substance into an all-trans-retinal as a second configuration by photoisomerization, and the step of storing energy includes the step of transforming the all-trans-retinal back into the cis-configuration by contacting the all-trans-retinal to one of a stereoselective pigment and a stereoselective catalyst embedded in the pigment thereby absorbing energy.

3. The method of claim 1, further comprising the steps of screening the first photosensitive stereoisomeric configuration of the storage substance from light, and wherein the step of liberating energy includes the step of subjecting the photosensitive stereoisomeric configuration to solar radiation for initiating the stereoisomeric transformation so as to liberate the stored energy.

4. The method of claim 1, further comprising the step of binding the photosensitive configuration of the storage substance to a stereospecific binding substrate for storage and transport purposes.

5. The method of claim 4, further comprising the step of providing an opsin as the stereospecific binding substrate, which together with 11-cis-retinal forms rhodopsin as the photosensitive configuration of the storage substance.

6. The method of claim 4, further comprising the steps of providing a cellular binding protein (CRALBP) as the stereospecific binding substrate, and forming the cellular binding protein which together with 11-cis-retinal forms a light-shielding compound CRALBP·11-cis-retinal.

7. The method of claim 1, wherein the step of liberating energy further comprises the step of transforming an 11-cis-retinal as the first, photosensitive configuration of the storage substance into all-trans-retinal as the second configuration by photoisomerization, and wherein the step of storing energy further comprises the step of transforming the all-trans-retinal back into the 11-cis-configuration by contacting the all-trans-retinal to a stereoselective catalyst embedded in a stereoselective pigment.

8. A latent store for storing and liberating energy, comprising: a plurality of carriers; a stereoisomeric storage substance and a regeneration medium are each positioned on a respective one of said plurality of carriers; a motion means for moving the carriers with respect to each other so as to contact the storage substance and the regeneration medium against each other, and the photosensitive regeneration medium is continuously or intermittently subjectable to solar radiation; a means for screening the storage substance from solar radiation during the contact with the regeneration medium; and a means for intermittently subjecting the storage substance to solar radiation outside the contact with the regeneration medium so as to liberate the energy stored therein.

9. The latent store of claim 8, wherein the one carrier of said plurality of carriers carrying the storage substance has a high thermal conductivity.

10. The latent store of claim 9, wherein the one carrier of said plurality of carriers carrying the storage substance has a heat exchanger positioned therein, and the heat exchanger is aligned with respect to the one carrier of said plurality of carriers carrying the regeneration medium.

11. The latent store of claim 8, wherein the one carrier of said plurality of carriers carrying the storage substance is designed as a heat exchanger through which at least one of fluid and gas flows.

12. The latent store of claim 8, wherein the regeneration medium is shaped into regeneration medium disks, wherein the regeneration medium carrier has a plate with a multitude of openings which are positioned in angular increments with respect to each other for accepting the regeneration medium disks, and window recesses open with respect to a layer of the storage substance and positioned in the region inbetween the openings, wherein the storage substance carrier is rotatable in increments with respect to the regeneration medium carrier, and wherein the contact between the storage substance and the regeneration medium disks occurs in specified pauses of the incremental rotations.

13. The latent store of claim 12, wherein the regeneration medium disks are pressed disks stabilized by a lattice structure, in which the disks are subjectable to solar radiation on an outer side and can be pressed against the storage substance on an inner side thereof.

14. The latent store of claim 8, wherein the carrier accepting the storage substance is shaped as one of a cylinder, a cone and a truncated pyramid-shaped prism, at whose perimeter surface the storage substance is positioned, and wherein the regeneration medium carrier is a hollow carrier surrounding the storage substance carrier.

15. The latent store of claim 14, wherein the hollow carrier is axially moveable with respect to the storage substance carrier,.

16. The latent store of claim 8, wherein at least one of the storage substance and the regeneration medium have in the contact region a surface structure enlarging the total surface area.

* * * * *